United States Patent
Pritchard et al.

(10) Patent No.: US 8,308,598 B2
(45) Date of Patent: Nov. 13, 2012

(54) CONTROLLED DIFFERENTIAL ACTUATOR

(75) Inventors: Larry A. Pritchard, Macomb, MI (US); John Barlage, Rochester Hills, MI (US)

(73) Assignee: Borgwarner, Inc., Auburn Hills, MI (US)

( * ) Notice: Subject to any disclaimer, the term of this patent is extended or adjusted under 35 U.S.C. 154(b) by 294 days.

(21) Appl. No.: 12/676,025

(22) PCT Filed: Aug. 13, 2008

(86) PCT No.: PCT/US2008/073047
§ 371 (c)(1), (2), (4) Date: Mar. 2, 2010

(87) PCT Pub. No.: WO2009/038909
PCT Pub. Date: Mar. 26, 2009

(65) Prior Publication Data
US 2010/0240486 A1    Sep. 23, 2010

Related U.S. Application Data

(60) Provisional application No. 60/971,981, filed on Sep. 13, 2007.

(51) Int. Cl.
F16H 48/22 (2006.01)
(52) U.S. Cl. .......................... 475/150; 475/231
(58) Field of Classification Search .................. 475/150, 475/231
See application file for complete search history.

(56) References Cited

U.S. PATENT DOCUMENTS

| 4,860,612 | A | * | 8/1989 | Dick et al. | 74/665 H |
|---|---|---|---|---|---|
| 5,366,421 | A | * | 11/1994 | Hirota | 475/231 |
| 5,464,084 | A | * | 11/1995 | Aoki et al. | 192/35 |
| 6,019,694 | A | * | 2/2000 | Forrest et al. | 475/150 |
| 6,905,008 | B2 | * | 6/2005 | Kowalsky et al. | 192/35 |
| 2003/0040390 | A1 | * | 2/2003 | Forrest et al. | 475/150 |
| 2003/0054913 | A1 | * | 3/2003 | Sayama | 475/203 |
| 2006/0052207 | A1 | * | 3/2006 | Teraoka | 475/231 |

FOREIGN PATENT DOCUMENTS

| JP | 6-58347 | 3/1994 |
|---|---|---|
| JP | 6-144040 | 5/1994 |
| JP | 7-190171 | 7/1995 |
| JP | 7-233864 | 9/1995 |
| JP | 2003-301926 | 10/2003 |
| JP | 2006-266485 | 10/2006 |

OTHER PUBLICATIONS

PCT International Search Report—Feb. 25, 2009.

* cited by examiner

*Primary Examiner* — Sherry Estremsky
(74) *Attorney, Agent, or Firm* — Brinks Hofer Gilson & Lione

(57) ABSTRACT

A controlled differential actuator particularly adapted for differential applications for motor vehicle powertrains. The differential operator incorporates an electromagnetically applied first or primary clutch coupled to a second multi-disc clutch pack through a ball ramp operator. Energization of the solenoid coil selectively applies the main clutch pack which is coupled to a differential carrier and one of the axle half shafts connected with the differential assembly. Modulation of current applied to the solenoid coil allows a selective frictional coupling between the differential axle half shafts which provides desirable traction features for the associated motor vehicle.

10 Claims, 2 Drawing Sheets

CONTROLLED DIFFERENTIAL ACTUATOR

FIELD OF THE INVENTION

This invention relates to a motor vehicle powertrain differential assembly, and particularly to one that provides controlled actuation to selectively modulate coupling between axle halfshafts of a motor vehicle axle assembly. The assembly couples the halfshafts to the differential housing resulting in differential control.

BACKGROUND OF THE INVENTION

Motor vehicle powertrains typically incorporate a differential assembly which couples mechanical input power from a propeller shaft or other input member to drive a pair of vehicle wheels through axle halfshafts. Differentials allow differences in rotational speed to occur between the left and right-hand side driven axle halfshafts. The most basic design of differentials are known as open differentials and provide constant torque between the two axle halfshafts and do not operate to control the relative rotational speed between the axle shafts. A well-known disadvantage of open differentials occurs when one of the driven wheels engages the road surface with a low coefficient of friction ($\mu$) with the other having a higher $\mu$. In such operating conditions, the low tractive effort developed at the low p contact surface prevents significant toque from being developed on either axle. Since the torque between the two axles shafts is relatively constant for an open differential, little tractive effort can be developed to pull the vehicle from its position in the above described operating condition. Similar disadvantages occur in dynamic conditions when operating, especially in low μor so-called split μdriving conditions.

The above limitations of open differentials are well-known and numerous design approaches have been applied to address such shortcomings. One approach is known as a mechanical locking differential. These systems typically use mechanical or hydraulic actuators to couple the two axle halfshafts together such that they rotate at nearly constant speed. Thus in that operating condition, the two axles are not mutually torque limited. A mechanically based locking differential typically uses a clutch pack or interlocking components which lock the two axles together when a speed difference between the axles is detected or the operator commands that function. Other systems incorporate fluid couplings between the axles which provide a degree of mechanical coupling. Locking differentials which mechanically interlock the two axles together do not permit modulation of the coupling between the axles. Instead, the axles are either locked to rotate together or operate in the open condition. Other systems use electric motors or hydraulic pumps to actuate a coupling system across the differential. Electro-mechanical actuators are also used in some designs.

This invention is related to a differential actuator which enables a highly controlled coupling to occur between axle halfshafts of a driven axle through a solenoid applied primary clutch. The differential assembly of this invention can be adapted for front, rear, or four-wheel drive applications. For example the differential assembly may be applied to a front wheel drive transaxle or an all wheel drive center differential.

SUMMARY OF THE INVENTION

In accordance with the present invention, an electromagnetic clutch assembly having a solenoid actuator ball ramp operator is used to selectively couple and decouple a pair of axle shafts. The electromagnetic clutch assembly includes a primary or pilot friction clutch pack controlled by the primary clutch coupled with a secondary or main friction clutch pack. An annular solenoid coil and housing cooperate with an annular armature or plunger. When the coil is energized, the plunger translates and compresses the primary friction clutch pack. Activation of the primary clutch pack retards motion of one of the members of ball ramp actuator which in turn compresses the secondary friction clutch pack which couples the differential carrier with one of the axle halfshafts, resulting in differential control. This coupling also has the effect of directly coupling the two axle shafts. The electromagnetic clutch assembly provides a high degree of controlled coupling between axle shafts, with low power consumption necessary for controlling the actuation.

Additional benefits and advantages of the invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
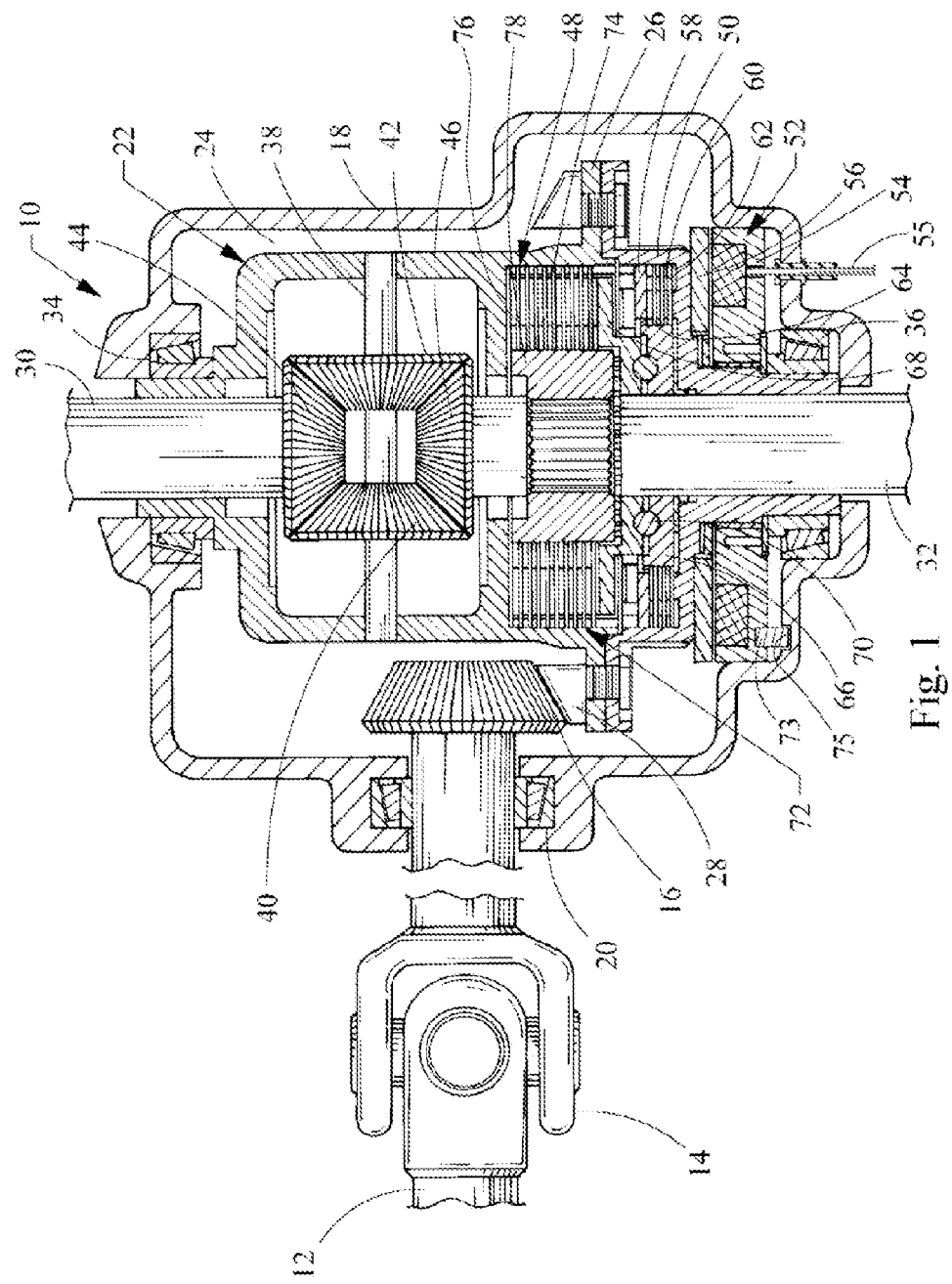
FIG. 1 is a cross-sectional view taken through the controlled differential actuator in accordance with the present invention incorporated within a vehicle differential assembly.

FIG. 1 illustrates a differential assembly in accordance with the present invention which is generally designated by reference number 10. Power transfer to the differential assembly 10 through propeller shaft 12 coupled with drive pinion gear 16 through U-joint 14. Differential case 18 encloses the internal components of differential assembly 10 and is a sealed enclosure which retains lubricating oil. Pinion bearing 20 supports the drive pinion 16 for rotation. Propeller shaft 12 is coupled typically through a gear transmission or other power transmission system which transmits mechanical power from the vehicle prime mover to differential assembly 10. Within differential case 18 is disposed carrier assembly 22. Carrier assembly 22 includes housing 24 which forms a radially protruding shoulder or flange 26 upon which ring gear 28 is fixed by screw fasteners. Rotation of drive pinion 16 causes rotation of ring gear 28 and carrier housing 24. Carrier assembly 22 rotates about a vertical axis, as the components are positioned in FIG. 1. A pair of axle halfshafts 30 and 32 protrude from differential case 18 and engage laterally disposed road wheels through suitable drive connections, such as universal or constant velocity joints. In other applications, axle halfshafts 30 and 32 run through rigid axle tubes and do not incorporate flexible rotational connections between the differential and the road engaging wheels. Axle halfshafts 30 and 32 are supported for rotation on rolling element bearings 34 and 36, respectively. Carrier shaft 38 is positioned within carrier housing 24 and supports a pair of bevel gears 40 and 42. A pair of side gears 44 and 46 mesh with bevel gears 40 and 42 and are respectively attached to axle halfshafts 30 and 32. The differential assembly 10 of this invention can be adapted for front, rear, or four-wheel drive applications. For example differential assembly 10 may be applied to a front wheel drive transaxle or an all-wheel drive center differential. In a front wheel drive application axles halfshafts would drive the front wheels of the vehicle, or rear wheels in the case of a rear wheel drive vehicle. In the case of a four wheel drive vehicle, differential assembly 10 could be used to drive front and rear propeller shafts rather than axle half shafts (in which case elements 30 and 32 would be the propeller shafts rather than axle halfshafts).

The above description of components are common to conventional open differentials. Operating in an open differential mode, rotation of drive pinion 16 causes rotation of carrier housing 24 through its meshing engagement with the ring gear 28. This rotational motion of carrier housing 24 causes bevel gears 40 and 42 to also rotate which are coupled to axle halfshafts 30 and 32 through their meshing engagement through side gears 44 and 46. Such an open differential arrangement allows one of the axle halfshafts 30 or 32 to operate at a different speed than the other axle halfshaft.

In accordance with the present invention, differential actuator assembly 48 is employed which selectively couples axle halfshaft 32 with carrier housing 24. Mechanically coupling these two elements together has the effect of causing both axle halfshafts 30 and 32 to rotate at the same speed or approach the same speed. As will be explained in more detail below, however, limited frictional coupling between axle half shaft 32 and carrier housing 24 allows a variable degree of mechanical engagement to occur between the axle halfshafts 30 and 32 from a range in which the differential operates in an open differential mode to a fully coupled or "locked" condition. A modulation of the coupling across the axles provides improved drivability and traction performance in many operating conditions.

Figure 2:
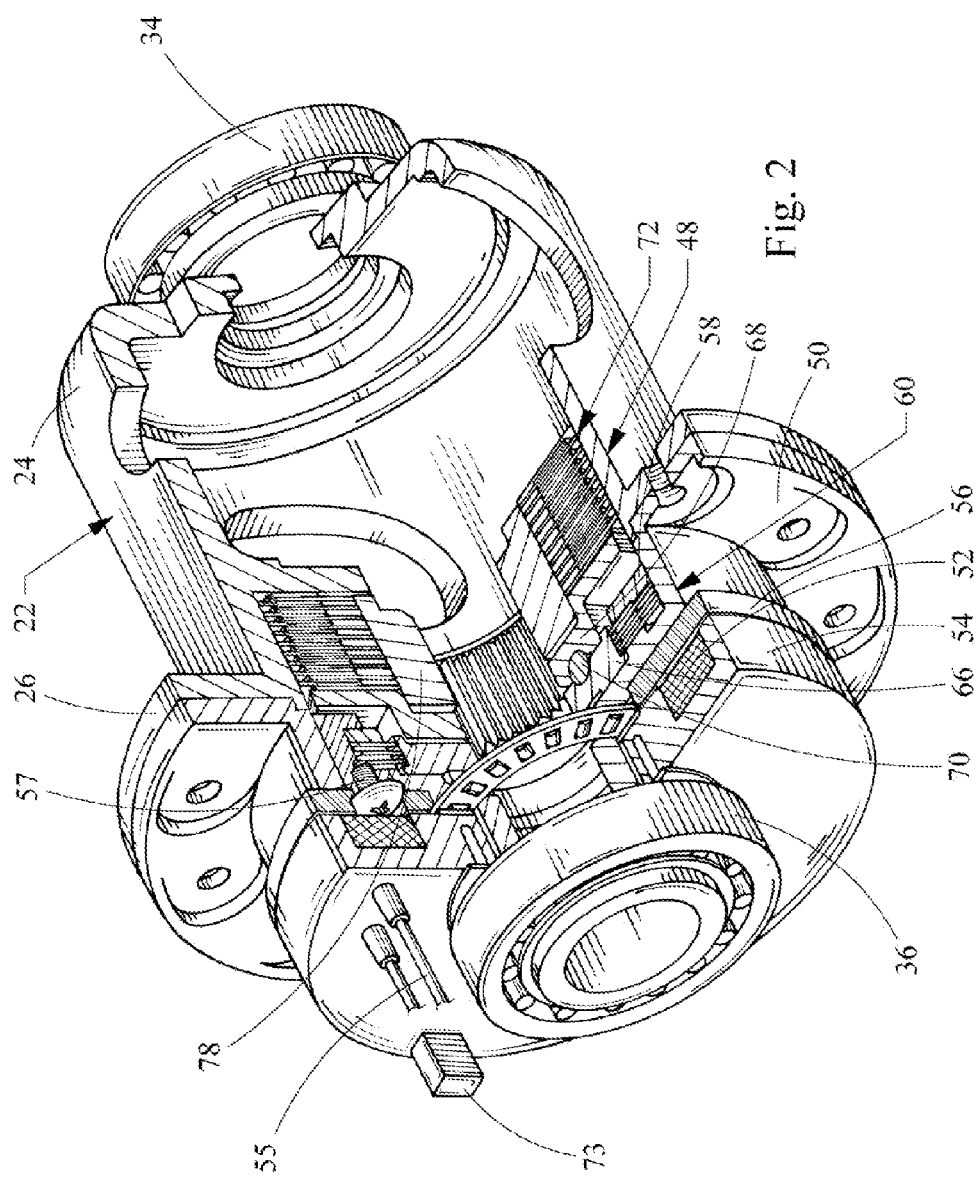
FIG. 2 is a pictorial view partially cut away showing the carrier subassembly of the differential actuator shown in FIG. 1.

Now referring to FIGS. 1 and 2, differential actuator assembly 48 is primarily disposed within carrier assembly housing 24 by end cap 50 which engages with the carrier housing at carrier flange 26. Secured within differential case 18 is an electromagnetic solenoid coil 52 positioned within a flux concentrating annular housing 54. Conductor leads 55 provide electrical energy to solenoid coil 52. Surrounding portions of solenoid coil 52 and annular housing 54 is an annular solenoid armature member 56 which forms a small air gap between itself and housing 54, and rotates with carrier assembly 22. The application of electrical energy to solenoid coil 52 causes armature 56 to be attracted toward annular housing 54. Tab 73 protrudes from housing 54 and fits into a pocket formed by differential case 18 to position the housing and prevent rotational movement of the housing.

Armature 56 is coupled with a plurality of stanchions or studs 57 which extend axially away from the armature through suitable axial passageways. Studs 57 are connected with apply plate 58. A pilot or primary friction clutch pack 60 is disposed between an internal surface of end cap 50 and apply plate 58. Energization of the solenoid coil 52 urges the armature 56 toward housing 54 which closes the air gap between these components and urges primary clutch apply plate 58 to compress the pilot or primary friction clutch pack 60.

Primary clutch pack 60 includes a first plurality of larger diameter clutch discs or plates 62 with a male or exterior splines which engage complimentary female splines formed by the inner surface of end cap 50. The clutch plates 62 thus rotate with carrier housing 24. Interleaved within the clutch plates 62 is a second plurality of smaller diameter friction clutch discs or plates 64 which engage with complimentary splines of a circular clutch hub 66. Both the first and second pluralities of clutch plates 64 and 66 preferably include suitable friction clutch paper or material at their interfaces which functions optimally when disposed in and wetted by a clutch fluid bath within carrier housing 24. Clutch hub 66 is freely rotatably disposed upon the output hub 68. The circular clutch hub 66 includes a plurality, preferably three, ramped recesses disposed in a circular pattern about the axis of the output hub 68. The recesses each define an oblique section of a helical torus. Disposed within each of the recesses is a load transferring member, such as ball 70. Output hub 68 is disposed facing clutch hub 66 and includes a similar plurality of complimentary sizing arranged recesses. Balls 70 are received and trapped within the pairs of opposing recesses between clutch hub 66 and output hub 68. Relative rotation between clutch hub 66 and output hub 68 causes balls 70 to move within their recesses which causes clutch hub 66 and output hub 68 to become separated, and therefore these elements comprise a relative rotation actuator.

The clutch hub 66, output hub 68, and balls 70 together cooperate to form a relative rotation actuator and more specifically a ball-ramp actuator. These devices function to convert relative rotation between components (hubs 68 and 66) to axial motion (separation of the hubs 66 and 68). It is within the scope of this invention to replace the ball-ramp operator described herein with other types of relative rotation actuators.

Disposed adjacent primary clutch pack 60 is a main or secondary friction clutch pack assembly 72. The secondary clutch pack 72 includes a first plurality of larger diameter friction clutch discs or plates 74 having external splines which are received within complimentary female splines of the inside diameter of carrier housing 24. Interweaved within the first plurality of friction clutch plates 74 is a second plurality of smaller diameter friction clutch discs or plates 76 having internal or female splines which engage complimentary configured male splines of axle hub 78. Both sets of the friction plates 74 and 76 preferably include friction clutch paper or material at their interfaces which functions optimally when disposed and wetted by clutch fluid. Axle hub 78 includes internal splines which mesh with the splined end of axle shaft 32. Axle shaft 32 thus has an end spline not only to engage with axle hub 78, but also to have splined engagement with side gear 46. As best shown in FIG. 1, differential actuator assembly 48 is packaged in a compact manner within the diameter of ring gear 28 and the differential actuator assembly is contained within differential case 18.

In operation, application of electrical energy to solenoid coil 52 draws armature 56 toward the annular housing 54, compressing the primary clutch pack 60 and creating drag which tends to rotate the clutch hub 66 relative to output hub 68, causing the load transferring balls 70 to ride up within their recesses and thus driving the clutch hub 66 and output hub 68 apart. The output hub 68 acts as an apply plate such that axial motion compresses secondary clutch pack 72. Applying secondary clutch pack 72 has the effect of coupling carrier housing 24 to axle half shaft 32. As mentioned previously, this has the effect of restricting relative rotation between the axle halfshafts 30 and 32, thus providing a degree of frictional coupling between the axle halfshafts. The geometric characteristics of the recesses having ball bearings 70 disposed therein is designed such that the clutches are not self actuating. In other words, the controlled application of coupling torque between the axle halfshafts 30 and 32 can be provided by modulating the electric current applied to solenoid coil 52.

It should be noted that the driving input for compressing main or secondary clutch pack 72 only occurs when there is a relative speed difference between axle halfshaft 32 and carrier housing 24. It is this difference in relative speed which causes relative rotation to occur between clutch hub 66 and output hub 68. This relative rotation can occur in either rotational direction sense. In some operating conditions, axle halfshaft 32 would be rotating faster than the carrier housing, and in other applications, slower. In either case, the relative speed difference occurs between hubs 66 and 68 which enables balls 70 to actuate the secondary clutch pack 72. Additional details of the internal components of differential actuator 48 is provided by U.S. Pat. No. 6,905,008 which is co-owned by the Assignee of this invention, which is hereby incorporated by reference.

While the above description constitutes the preferred embodiment of the present invention, it will be appreciated that the invention is susceptible to modification, variation and change without departing from the proper scope and fair meaning of the accompanying claims.

The invention claimed is:

1. A controlled differential assembly (10) for a motor vehicle powertrain of the type having an input pinion gear (16) and driving a pair of axle halfshafts (30, 32), comprising:
   a carrier assembly (22) within a case (18) enclosing internal components of the differential assembly, the carrier assembly driven for rotation within the differential case, the carrier assembly having a housing (24) enclosing a plurality of gears (28, 40, 42, 44, 46) coupled with the axle halfshafts,
   a differential actuator assembly (48) having a solenoid coil (52) mounted to the differential case and an armature (56) affixed to the carrier housing and rotatable with the carrier assembly and positioned adjacent the solenoid coil and connected to an apply plate (58) by a plurality of studs, a primary clutch pack (60) having a first set of plates (62) carried by the carrier housing and a second set of plates (64) coupled with a clutch hub (66), the armature and the apply plate being located on opposite sides of the primary clutch pack and the studs extending through the first set of plates of the primary clutch pack, a secondary clutch pack (72) having a first set of plates (74) carried by the carrier housing and a second set of plates (76) coupled with an axle hub (78) coupled with one of the axle shafts, a relative rotation actuator (66, 68, 70) acting between the clutch hub and an output hub (68), wherein relative rotation between the clutch hub and the output hub causes separation between the clutch hub and the output hub and the output hub acting to compress the first and second plates of the secondary clutch pack and wherein energization of the solenoid coil causes the armature to move toward the solenoid coil causing the apply plate to compress the primary clutch pack and actuating the secondary clutch pack through the relative rotation actuator thereby coupling the carrier housing with the one axle shaft.

2. The controlled differential assembly according with claim 1 wherein the relative rotation actuator is a ball ramp actuator.

3. The controlled differential assembly according to claim 1 wherein the carrier assembly is driven for rotation by a ring gear (28) attached to the carrier housing driven by the input pinion gear.

4. The controlled differential assembly according to claim 3 wherein the primary and secondary clutches are contained within the carrier housing and radially within the ring gear.

5. The controlled differential assembly according to claim 1 wherein the differential housing includes an internal liquid clutch fluid bathing the primary and secondary clutch packs.

6. The controlled differential assembly according to claim 1 wherein the differential assembly is coupled with front wheels of the motor vehicle.

7. The controlled differential assembly according to claim 1 wherein the differential assembly is coupled with the rear wheels of the motor vehicle.

8. The controlled differential assembly according to claim 1 wherein the differential assembly is coupled between front and rear wheel axles of the motor vehicle.

9. The controlled differential assembly according to claim 1 wherein the differential housing is coupled with the axle halfshafts though a pair of side gears (44, 46) with one of the side gears coupled with one of the axle half shafts and meshing with a pair of bevel gears (40, 42) driven for rotation by the carrier housing.

10. The controlled differential assembly according to claim 9 wherein one of the axle halfshafts has a splined connection with one of the side gears and the axle hub.

* * * * *